United States Patent [19]

Speiser et al.

[11] 3,925,648

[45] Dec. 9, 1975

[54] APPARATUS FOR THE GENERATION OF A HIGH CAPACITY CHIRP-Z TRANSFORM

[75] Inventors: Jeffrey M. Speiser; Harper J. Whitehouse; James M. Alsup, all of San Diego, Calif.

[73] Assignee: The United States of America as represented by the Secretary of the Navy, Washington, D.C.

[22] Filed: July 11, 1974

[21] Appl. No.: 487,849

[52] U.S. Cl. .............. 235/156; 235/150.53; 333/72

[51] Int. Cl.[2] ...................... G06F 15/34; G06G 7/19

[58] Field of Search ...... 235/181, 150.53, 152, 156; 333/30, 72

[56] References Cited

UNITED STATES PATENTS

| | | | |
|---|---|---|---|
| 3,701,147 | 10/1972 | Whitehouse | 333/30 |
| 3,723,916 | 3/1973 | Speiser et al. | 333/30 |
| 3,754,128 | 8/1973 | Corinthios | 235/156 |
| 3,767,905 | 10/1973 | Garde | 235/156 |

OTHER PUBLICATIONS

Alsup, et al., Real Time Discrete Transforms Using Surface Acoustic Wave Devices, IEE International Specialist Seminar on Component Performance and System Applications of Surface Acoustic Wave Devices, Aviemore, Scotland, Sept., 1973.

Means, et al., Image Transmission via Spread Spectrum Techniques, ARPA Quarterly Technical Report, June 1, 1973, to Oct. 1, 1973.

The Chirp–Z–Transform Algorithm and Its Application, Rabnier, et al., Bell System Technical Journal, May–June, 1969, pp. 1249–1292.

The Chirp–Z–Transform Algorithm, Vol. AU–17, No. 2, June, 1969, Rabnier, et al., IEEE Transactions on Audio and Electroacoustics, pp. 86–92.

A Computer Method for Obtaining Z–Transforms, Robinson, IEEE Trans. on Audio and Electroacoustics, Mar., 1972, pp. 98–99.

*Primary Examiner*—Felix D. Gruber
*Attorney, Agent, or Firm*—Richard S. Sciascia; Ervin F. Johnston; John Stan

[57] ABSTRACT

Apparatus for performing a high-capacity two-dimensional, chirp-z transform, suitable for the signal processing of radar and sonar signals, comprising: an $N_2$ plurality of two-dimensional partial chirp-Z transform devices; an acoustic surface-wave demultiplexer and chirp multiplier, whose inputs comprise all the outputs of the partial transform devices; an acoustic surface-wave discrete chirp filter, whose input comprises the output of the demultiplexer and chirp multiplier; and an output multiplier whose two inputs comprise the output of the surface-wave demultiplexer and chirp multiplier and the output of the acoustic surface-wave discrete chirp generator, the output of the output multiplier comprising the terms of a one-dimensional chirp-z transform in a linear congruential scan.

2 Claims, 11 Drawing Figures

TWO-DIMENSIONAL PARTIAL CHIRP-Z TRANSFORM.

EXAMPLE:

LET $N_1 = 3$
$N_2 = 4$ $g_{j_1 j_2}$ $$\begin{array}{cccc|l} j_2=3 & j_2=2 & j_2=1 & j_2=0 & \\ \end{array}$$

$$\begin{pmatrix} g_{03} & g_{02} & g_{01} & g_{00} \\ g_{13} & g_{12} & g_{11} & g_{10} \\ g_{23} & g_{22} & g_{21} & g_{20} \end{pmatrix} \begin{array}{l} j_1 = 0 \\ j_1 = 1 \\ j_1 = 2 \end{array}$$

$$\parallel$$

$$\begin{pmatrix} f_9 & f_6 & f_3 & f_0 \\ f_1 & f_{10} & f_7 & f_4 \\ f_5 & f_2 & f_{11} & f_8 \end{pmatrix}$$

FIG. 1. ILLUSTRATION OF THE DESIRED SCAN FOR $N_1 = 3$, $N_2 = 4$.

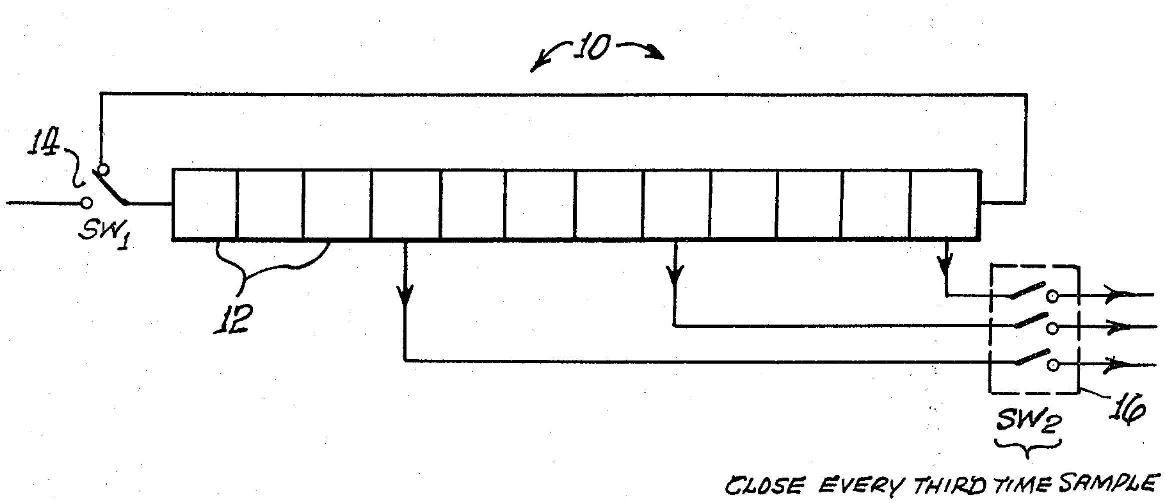

FIG. 2.

MULTIPLEXER FOR CONVERTING A ONE DIMENSIONAL DISCRETE FOURIER TRANSFORM INTO A TWO-DIMENSIONAL DISCRETE FOURIER TRANSFORM (FOR $N_1 = 3$, $N_2 = 4$).

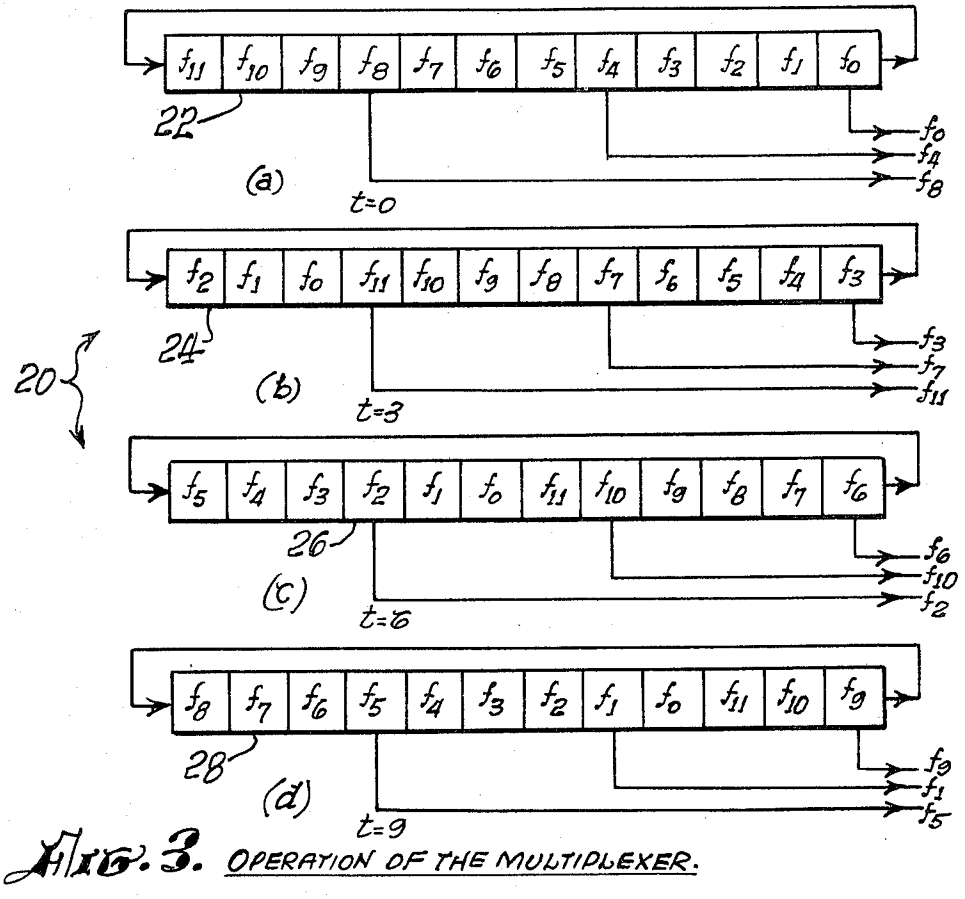
FIG. 3. OPERATION OF THE MULTIPLEXER.
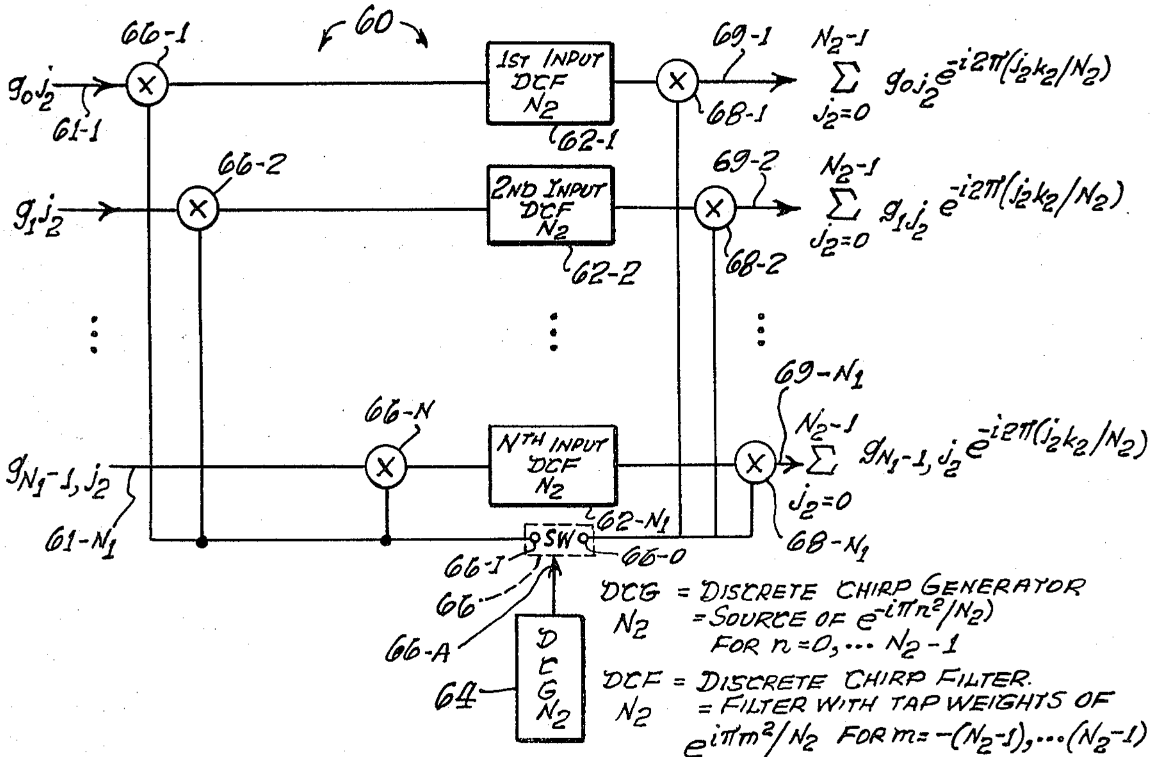
FIG. 5. TWO-DIMENSIONAL PARTIAL CHIRP-Z TRANSFORM.

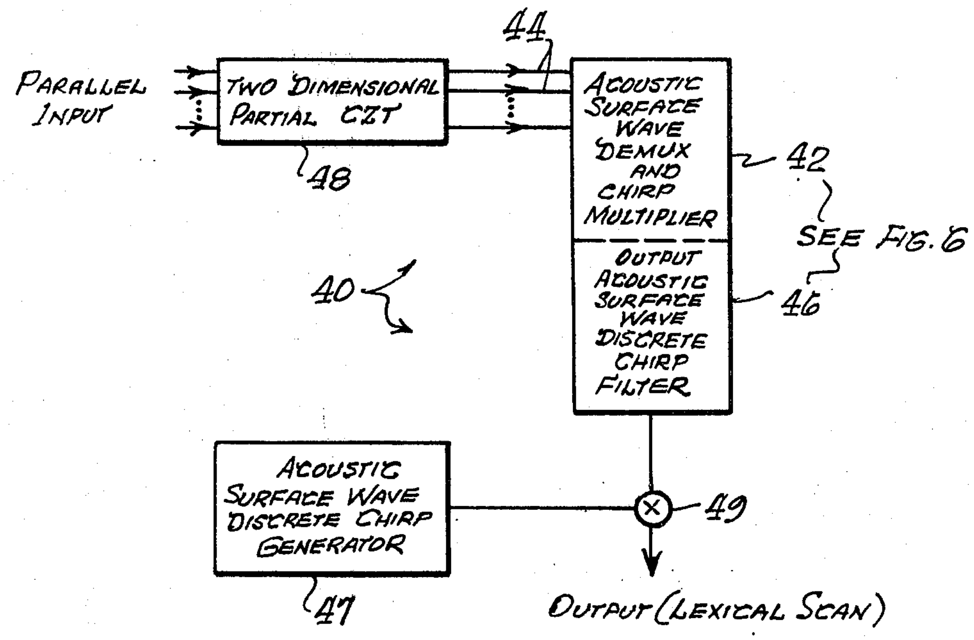
FIG. 4. HYBRID IMPLEMENTATION OF TWO-DIMENSIONAL CZT.
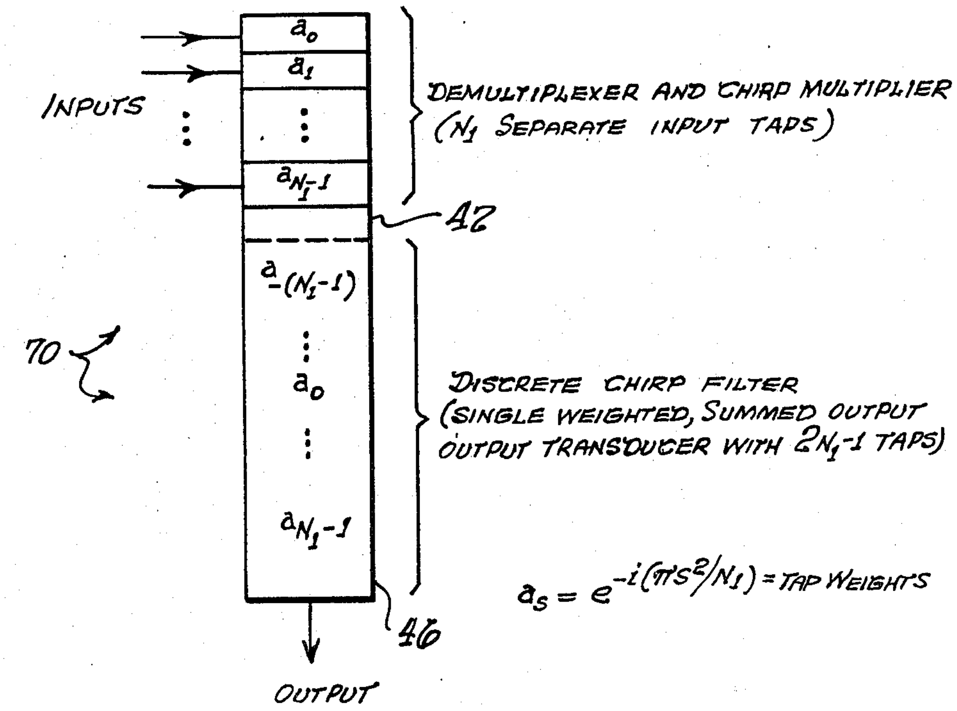
FIG. 6. TAP WEIGHTS AND STRUCTURE FOR ACOUSTIC SURFACE WAVE COMBINED DEMULTIPLEXER, CHIRP MULTIPLIER, AND DISCRETE CHIRP FILTER.

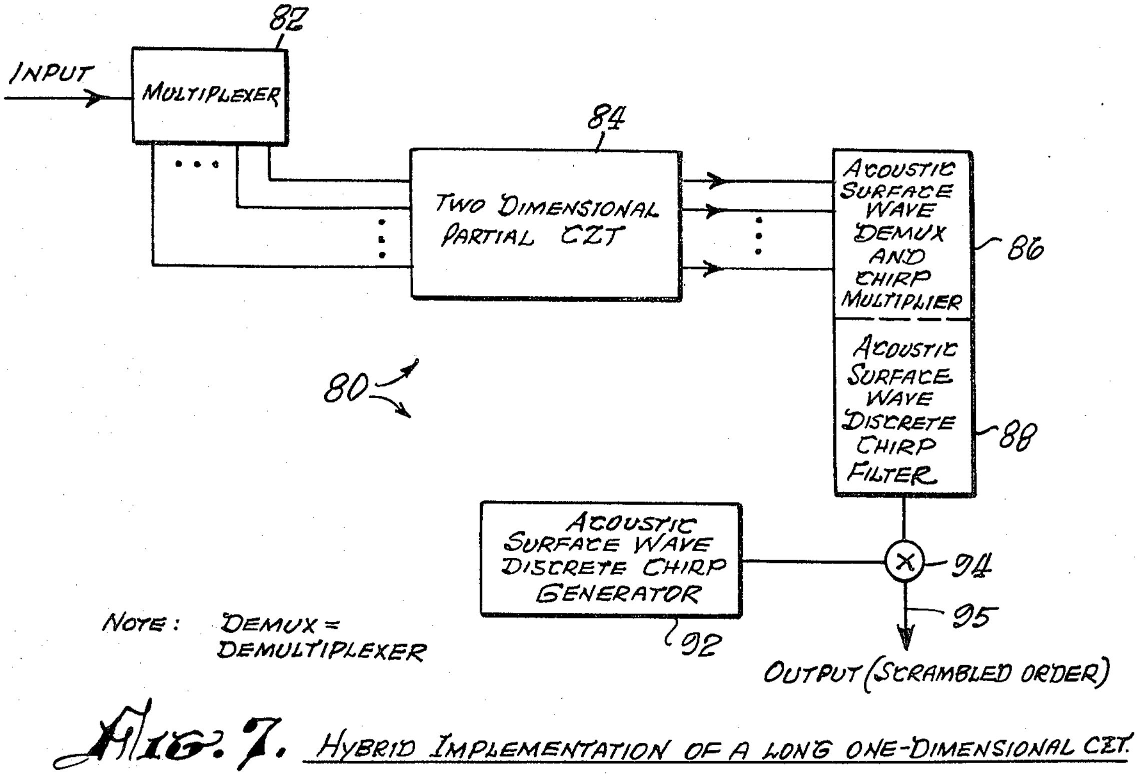
FIG. 7. HYBRID IMPLEMENTATION OF A LONG ONE-DIMENSIONAL CZT
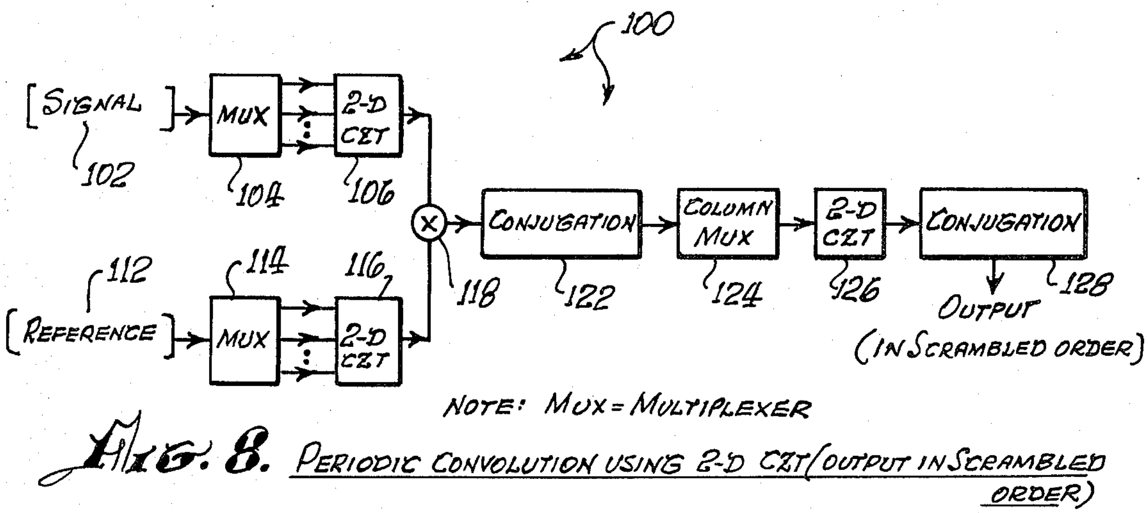
FIG. 8. PERIODIC CONVOLUTION USING 2-D CZT (OUTPUT IN SCRAMBLED ORDER)

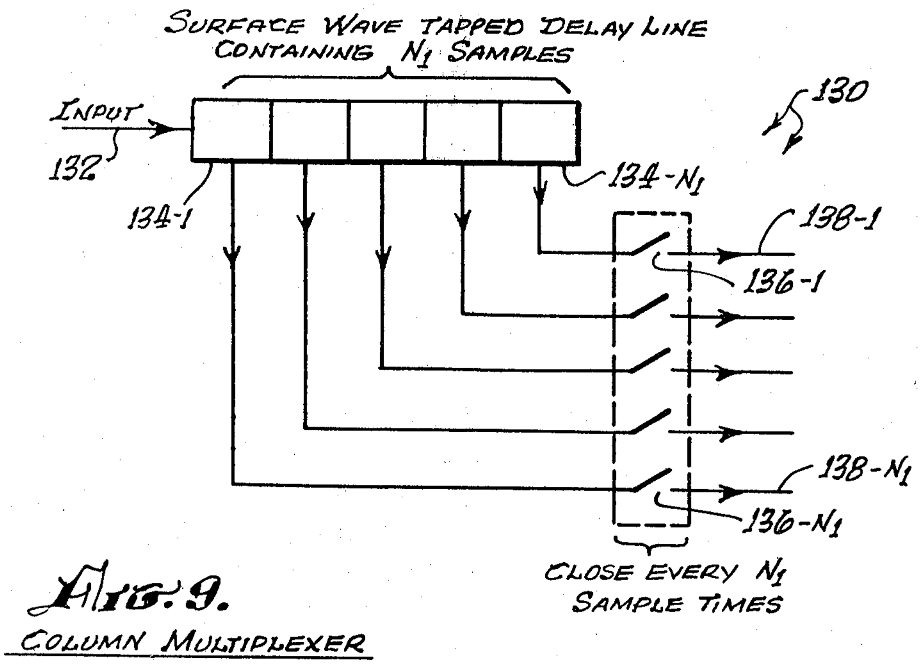

FIG. 9.
COLUMN MULTIPLEXER (a) $N_1 = N_2 = N_3$ $$\begin{array}{ccc} j_2=2 & j_2=1 & j_2=0 \end{array}$$
$$\begin{pmatrix} f_2 & f_1 & f_0 \\ f_5 & f_4 & f_3 \\ f_8 & f_7 & f_6 \end{pmatrix} \begin{array}{c} j_1=0 \\ j_1=1 \\ j_1=2 \end{array}$$

FIG. 10.
ILLUSTRATION OF THE LEXICAL SCAN (b) $N_1 = 3$, $N_2 = 4$ $$\begin{array}{cccc} j_2=3 & j_2=2 & j_2=1 & j_2=0 \end{array}$$
$$\begin{pmatrix} f_3 & f_2 & f_1 & f_0 \\ f_7 & f_6 & f_5 & f_4 \\ f_{11} & f_{10} & f_9 & f_8 \end{pmatrix} \begin{array}{c} j_1=0 \\ j_1=1 \\ j_1=2 \end{array}$$

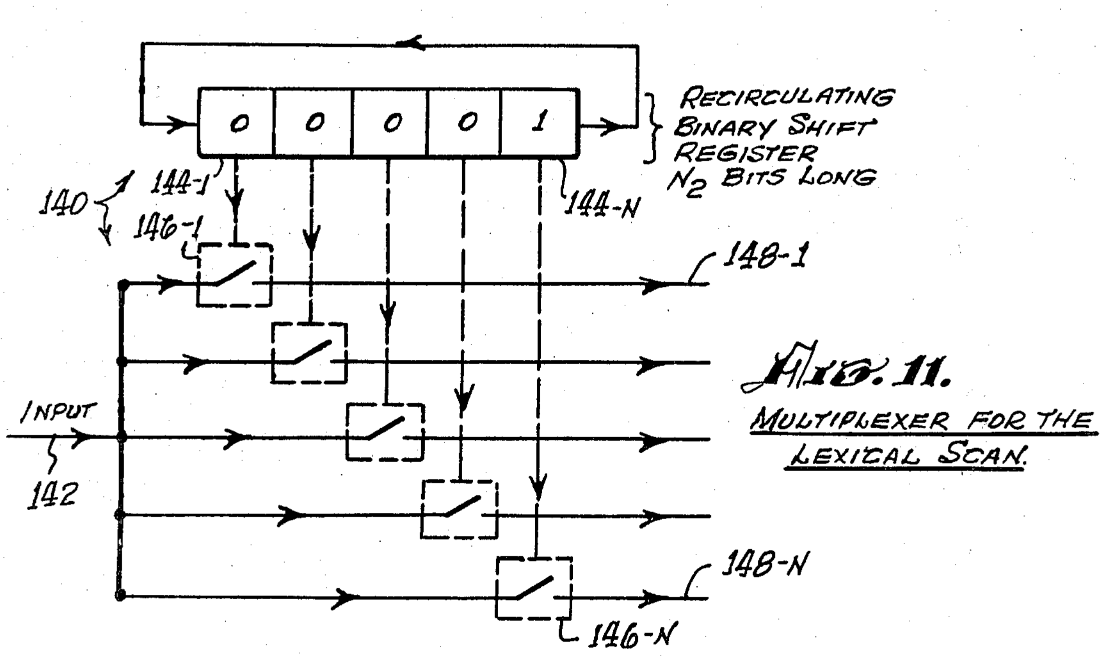

FIG. 11.
MULTIPLEXER FOR THE LEXICAL SCAN.

APPARATUS FOR THE GENERATION OF A HIGH CAPACITY CHIRP-Z TRANSFORM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

High-speed serial-access discrete Fourier transform (DFT) devices have been built, and described in the prior art, using the chirp-z transform (CZT) with transversal filter implementation of the required convolution. Such devices perform a DFT by premultiplying by a discrete chirp, convolving with a discrete chirp, and postmultiplying by a discrete chirp. One transform point is obtained per shift, and the size of the transform is proportional to the number of taps in the transversal filter used to perform the convolution. If the data is not recirculated through the filter, then 2N-1 taps are required to implement an N-point DFT. Using present acoustic surface-wave or charge-coupled device (CCD) transversal filter technology, it is difficult to implement a transversal filter with more than about 1000 independent taps, and therefore a direct transversal filter implementation of the DFT via a one-dimensional CZT is limited to a size of about 500 points.

This invention relates to configurations based on a multidimensional CZT, which use a small number of high-speed transversal filters together with a larger number of low-speed transversal filters to implement a CZT whose speed is determined by the shift rate of the high-speed transversal filters and whose transform size is determined by the total number of taps of all the low-speed transversal filters.

It has previously been shown that if $N = N_1N_2$ where $N_1$ and $N_2$ have no common divisor, then the one-dimensional discrete Fourier transform (DFT) of equation (1) and the two-dimensional DFT of equation (2) are equivalent.

$$\hat{f}_q = \sum_{p=0}^{N-1} f_p e^{-i2\pi \frac{pq}{N}} \quad \text{for } p,q = 0, 1, \ldots, N-1 \tag{1}$$

$$\hat{g}(k_1,k_2) = \sum_{j_1=0}^{N_1-1} \sum_{j_2=0}^{N_2-1} g(j_1,j_2) e^{-i2\pi \left[\frac{j_1k_1}{N_1} + \frac{j_2k_2}{N_2}\right]} \tag{2}$$

for $j_1, k_1 = 0, 1, \ldots, N_1-1$

The equivalence of the above equations is developed by Preisendorfer, R. W., Introduction to Fast Fourier Transforms, Visibility Laboratory, University of California, San Diego, Spring 1967, and Cooley, James W., Peter A. W. Lewis, and Peter D. Welch, Historical Notes on the Fast Fourier Transform, IEEE Transactions on Audio and Electroacoustics, Vol. AU-15, pp. 76–79, June 1967.

The scan required to make the two transforms exactly equivalent is not a simple lexical scan, but rather a linear congruential scan such as that shown in equations (3) and (4).

$$p(j_1,j_2) = j_1N_2 + j_2N_1 \pmod{N} \tag{3}$$

$$q(k_1,k_2) = k_1U_1N_2 + k_2U_2N_1 \pmod{N} \tag{4}$$

The constants $U_1$ and $U_2$ are the solutions of equations (5) and (6).

$$N_2U_1 = 1 \pmod{N_1} \tag{5}$$

$$N_1U_2 = 1 \pmod{N_2} \tag{6}$$

In special cases the output scan is very similar to the input scan. For example, if $N_2 = N_1+1$, then $U_1=1$ and $U_2=-1$, so that the two scans are given by equations (7) and (8).

$$p = j_1N_2 + j_2N_1 \pmod{N} \tag{7}$$

$$q = k_1N_2 - k_2N_1 \pmod{N} \tag{8}$$

SUMMARY OF THE INVENTION

This invention relates to an apparatus for performing a high-capacity two-dimensional, chirp Z transform, in size $N_1$ times $N_2$, suitable for the signal processing of radar and sonar signals, comprising: an $N_2$ plurality of two-dimensional partial chirp-Z transform devices; an acoustic surface-wave demultiplexer and chirp multipler, whose inputs comprise all the outputs of the partial transform devices; an acoustic surface-wave discrete chirp filter, whose input comprises the output of the demultiplexer and chirp multiplier; and an output multiplier whose two inputs comprise the output of the surface-wave demultiplexer and chirp multiplier and the output of the acoustic surface-wave discrete chirp generator, the output of the output multiplier comprising the terms of a one-dimensional chirp-Z transform in a linear congruential scan.

BRIEF DESCRIPTION OF THE DRAWINGS

FIG. 1 is a chart of a linear congruential scan for a chosen set of matrix parameters.

FIG. 2 is a diagram of a multiplexer for converting a one-dimensional discrete Fourier transform into a two-dimensional discrete Fourier transform, for the same parameters given in FIG. 1.

FIG. 3 is a schematic diagram showing the operation of a multiplexer.

FIG. 4 is a block diagram showing a hybrid implementation of a two-dimensional chirp-z transform.

FIG. 5 is a schematic diagram of apparatus for the generation of a two dimensional partial chirp-z transform.

FIG. 6 is a block diagram of a part of FIG. 5, showing the tap weights and structure for an acoustic surface wave combined demultiplexer, chirp multipler, and discrete chirp filter FIG. 7 is a block diagram of a hybrid implementation of a long one-dimensional chirp-z transform.

FIG. 8 is a block diagram of apparatus for performing the periodic convolution using two-dimensional chirp-z transform, with the output in scrambled order.

FIG. 9 is a block diagram of a column multiplexer.

FIG. 10 is a chart illustrating lexical scan.

FIG. 11 is a block diagram of a multiplexer for performing a lexical scan.

DESCRIPTION OF THE PREFERRED EMBODIMENTS

Before describing the operative embodiments in detail, some preliminary information should prove useful.

A linear congruential scan is illustrated in FIG. 1, and a means of converting the one-dimensional data to the required two-dimensional format is shown in FIG. 2. The multiplexer 10 of FIG. 2 may be implemented with an acoustic surface wave delay line 12, together with auxiliary high speed analog switches, 14 and 16. The most suitable analog switches at the present time would appear to be balanced mixers, since they are capable of switching in 1–2 nanoseconds. As shown in the multiplexers 10 and 20 of FIGS. 2 and 3, the data is recirculated once.

FIG. 3 is a timing diagram. It depicts the multiplexer 10 of FIG. 2, as multiplexer 22, 24, 26 or 28 of FIG. 3 at various times.

It will be noted that if $N_1$ and $N_2$ are nearly equal, the required number of taps is about $N^{0.5}$, so that for a long transform the required number of taps is much smaller than the number of samples stored in the line. This greatly reduces the problem of dispersion produced by acoustic scattering from the taps. For example, only 100 taps would be needed for the multiplexers of a transform of size about 10,000. Transversal filters with 100 taps and delay lines storing 10,000 samples are well within the existing state of the art.

A complete two-dimensional CZT embodiment 60 is shown in FIG. 5, and the required coding for the column access surface wave device 42 is shown as structure 70, in FIG. 6. The complex arithmetic may be implemented as described in the prior art.

In FIG. 6 are shown a total of $N_1$ launch transducers, indicated by reference numeral 42, with weights from $a_0$ to $a_{N-1}$. There is a single receive transducer, indicated by reference numeral 46, having a 2 $N_1$–1 total number of taps. By use of a method shown in the prior art for constructing weighted taps, utilizing the equation shown, FIG. 6 the design specifications are fully given. Details for constructing properly weighted taps are discussed, for example, in the ARPA Quarterly Technical Report, QR 2, dated June 1, 1973 - Oct. 1, 1973, published by the Naval Undersea Center, San Diego, California, 92132. Reference is directed specifically to FIGS. 3, 4, and 5, pages 83, 85 and 86.

Referring again to FIG. 4, this figure illustrates an apparatus 40 utilizing an acoustic surface-wave device 42 with multiple input taps, fed by leads 44, to access a column of the partially transformed output in a single shift time of the partial transform device, 48 of FIG. 4 and 60 of FIG. 5. With appropriate coding of the surface-wave column access device 42 of FIG. 4, it may also perform the discrete chirp premultiplication and discrete chirp convolution of a DFT in the "vertical" direction.

For the linear congruential scan, using the multiplexer 10 described in FIG. 2, the block diagram shown in FIG. 4 is complete. FIG. 4 uses the two-dimensional partial CZT 60 shown in FIG. 5.

Once the data is in a two-dimensional format, with simultaneous serial access to all the rows, it may be transformed in the "horizontal" direction by the structure 60 shown in FIG. 5. The individual one-dimensional discrete chirp filters, 62-1 through 62-$N_1$, and the discrete chirp generator 64 may be implemented using charge-coupled devices or digital correlators. Details are given in the ARPA publication referred to hereinabove, in the article, on page 94, entitled REAL TIME DISCRETE FOURIER TRANSFORMS USING CHARGE TRANSFER DEVICES.

A balanced mixer may be used for the fast multiplier required for the vertical transform. Lower speed variable transconductance multipliers may be used in the horizontal partial transform.

Describing now with more specificity an embodiment which generates the terms of a chirp-z transform in a linear congruential scan, reference is directed to FIGS. 4 and 5. Therein is shown an apparatus 40 for performing a high-capacity two-dimensional, chirp Z transform, in size $N_1$ times $N_2$, suitable for the signal processing of radar and sonar signals, comprising an $N_2$ plurality of two-dimensional partial chirp-Z transform devices, 48 in FIG. 4 and 60 in FIG. 5, each transform device comprising: a discrete chirp generator, 47 in FIG. 4 and 64 in FIG. 5, which comprises a source of $e^{-\pi n^2 / N_2}$ signals, for $n = 0, 1, ..., N_2-1$.

The transform device 60 of FIG. 5 includes a plurality of $N_1$ signal input multipliers, 66-1 through 66-$N_1$, each receiving two input signals, one being one of the $N_1$ columnar input transform values. A switching device shown symbolically as a single-pole double-throw (SPDT) switch, but actually of the balanced mixer type, is shown with its switching pole 66-A connected to the discrete chirp generator 64. One fixed pole, the input pole 66-I, is connected to each of the plurality $N_1$ of input multipliers 66-1 through 66-N. Input signals 61-l through 61-N, having transform values $g_{0 j_2}$ through $g_{n_1-1, j_2}$ from a column of the matrix of the $N_2$ columns of values and constitute the other inputs to the input multipliers, 66-l through 66-N.

A plurality of $N_1$ input discrete chirp filters, 62-l through 62-$N_1$, have tap weights of $e^{-\pi m^2 / N_2}$, for m = $-(N_2-1)$, ..., $(N_2-1)$. Each filter has its input connected to the output of one of the input multipliers, 66-l through 66-$N_1$.

The transform apparatus 60 includes a plurality of $N_1$ signal output multipliers, 68-l through 68-N, each multiplier having one input connected to the output of one of the discrete chirp filters, 62-l through 62-$N_1$, the other input being connected to the other pole, the output pole 66-O of the SPDT switching device 66, the $N_1$ outputs of the multipliers comprising output signals $$\sum_{j_2=0}^{N_2-1} q_{j_1} \; e^{-i2\pi (j_2 k_2 / N_2)}$$

The above expression is a partial transform, which describes a two-dimensional array with indices $j_1$ and $j_2$. The transformation is done according to the $j_2$ index, with the $j_1$ index being constant. The $j_1$ index merely points out which row is being transformed. The index $k_2$ is the output frequency index.

Referring back to FIG. 4, the apparatus 40 further comprises an acoustic surface-wave demultiplexer and chirp multiplier 42, whose inputs 44 comprise all the outputs, 69-l through 69-$N_1$, of the partial transform devices of the type 60 shown in FIG. 5.

An acoustic surface-wave discrete chirp filter 46 has as its input the output of the demultiplexer and chirp multiplier 42. An output multiplier 49 has as its two inputs the output of the surface-wave demultiplexer and chirp multiplier 46 and the output of the acoustic surface-wave discrete chirp generator 47, the output of the output multiplier comprising the terms of a one-dimensional chirp-Z transform in a linear congruential scan. One method by which this may be accomplished is shown in FIG. 5, on Page 107, of the ARPA reference, described hereinabove.

In FIG. 5 the g terms, which have no circumflex symbol over them, indicate input data to a matrix, a matrix which is being accessed one column at a time. The first index 0, 1, ...., $N_1$–1, plays the part of a vertical position index, while the index $j_2$ plays the role of a time index. The first index is the same as the $j_1$ index in equation (2).

The terms on the right-hand side of FIG. 5 are partial transforms. A two-dimensional function has been taken and transformed with respect to the $j_2$ index. For example, the output 66-l of the upper right-hand multiplier 68-l is the transform with respect to the term $j_2$ at $j_1 = 0$, since 0 is the first subscript of the $j_0j_2$ term at input 61-1. The output 69-2 of the multiplier 68-2 is the transform with respect to the term $j_2$ at $j_1 = 1$, etc.

The "linear congruential" scan, pertinent up to this point, is so termed because it is defined by the two linear congruence equations. However, if a lexical scan is used instead, allowing for the simpler input multiplexer 160 of FIG. 11, then FIG. 5 must be slightly modified. The multiplication shown in the right side of FIG. 5 must then be followed by additional multiplication by sinusoids, with a different frequency for the sinusoids of each of the vertical positions.

Or equivalently, instead of using the single discrete chirp generator 64 in FIG. 4, for all the output channels, through output multipliers 68-l through 68-N$_1$, separate, discrete chirp generators could be used which have the same chirp characteristic but the chirps function on different sinusoidal carriers. In a manner, they are frequency offset versions of the same chirp, with a different frequency offset used for each of the signals going into the output multipliers, 68-l through 68-N$_1$. This plurality of discrete chirp filters 64 would only be necessary if a lexical scan were being used.

The scan conversion multiplexer 10 of FIG. 2 may be combined with the two-dimensional CZT 40 of FIG. 4 to yield a high capacity CZT device 80, as shown in FIG. 7, by means of the CZT decomposition. The throughput rate of the resulting CZT device 80 is proportional to the sample rate of the surface wave components, and the transform size is proportional to the total number of taps of all the transversal filters or digital correlators used in the two dimensional partial CZT.

What is achievable by means of the hybrid implementation 80 shown in FIG. 7, is that a very long, very high-speed, one dimensional DFT can be used for very high-speed real time spectral analysis. Several such devices 80 may be combined to perform real time, very high speed, cross-convolution and cross-correlation, two very useful operations in signal processing.

The high capacity CZT device 80 can be used as a high-speed, high-resolution spectrum analyzer, or as a high-bandwidth matched filter with many degrees of freedom and variable reference function.

The matched filter or cross-convolver use of the high capacity CZT device 100 is shown in FIG. 8. Referring now to FIG. 9, the required column multiplexer 130 may be realized as a small surface-wave device with a single input tap connected to input 132 and a number of unweighted output taps, 134-l through 134-N$_1$, together with a number of high speed analog switches, 136-l through 136-N$_1$. When the device 130 is fully loaded, the switches 136-l through 136-N$_1$, are all closed and the serially input data column which inputted at input 132, is available in parallel at the outputs, 138-l through 138-N$_1$, of the switches.

The DFT device 80 of FIG. 7 using the linear congruential scan of equation (3) has several limitations: the horizontal and vertical sizes of $N_2$ and $N_1$ must have no common divider, the data must recirculate through acoustic surface wave device of the multiplexer 82, and the output 95 of the DFT is in the scrambled order given by equation (4).

A lexical scan similar to one half of a television interlaced scan may be used to convert a one-dimensional DFT almost into a two-dimensional DFT. Full details of the conversion are given by Gold, Ben and Theodore Bially, Parallelism in Fast Fourier Transform Hardware, IEEE Transactions on Audio and Electroacoustics, Vol. AU-21, No. 1, pp. 5–16, Feb. 1973. The word "almost" is used because of the presence of an additional phase factor which must be inserted after the first partial transform is performed. Although this scan has been previously proposed for parallel computation of the FFT, as discussed in the just referenced article, it lends itself equally well to the organization of parallel CZT hardware and largely circumvents the above mentioned limitations of the linear congruential scan. In particular, the lexical scan permits the complete elimination of the large surface wave delay line in the input multiplexer.

In the lexical scan defined by equations (9) and (10), $N = N_1N_2$ may be any factorization of N into the product of two integers.

$$p = j_1N_2 + j_2 \tag{9}$$

$$q = k_1 + k_2N_1 \tag{10}$$

for $j_1,k_1 = 0, 1, \ldots, N_1-1$ $j_2,k_2 = 0, 1, \ldots, N_2-1$

The DFT of equation (1) may be rewritten in terms of the lexical scans of equations (9) and (10) as shown in equation (11) and simplified slightly in equation (12).

$$\hat{f}_{k_1+k_2N_1} = \sum_{j_1=0}^{N_1-1} \sum_{j_2=0}^{N_2-1} f_{j_1N_2+j_2}\, e^{\frac{-i2\pi}{N}\left[(j_1N_2+j_2)(k_1+k_2N_1)\right]}$$

$$\hat{f}_{k_1+k_2N_1} = \sum_{j_2=0}^{N_2-1} e^{-i2\pi\frac{j_2k_2}{N_2}}\, e^{-i2\pi\frac{j_2k_1}{N}} \sum_{j_1=0}^{N_1-1} f_{j_1N_2+j_2}\, e^{-i2\pi\frac{j_1k_1}{N_1}} \tag{12}$$

for $k_1 = 0, 1, \ldots, N_1-1$ $k_2 = 0, 1, \ldots, N_2-1$, where the terms with a circumflex, again, designate the Fourier transform of the same terms without a circumflex.

Referring to Eq. (12), a long, discrete, Fourier transform has been performed by combining three operations in succession: (1) a partial Fourier transform with respect to the $j_1$ index; (2) next is a post-multiplication by sinusoids; and (3) another partial Fourier transform with respect to the $j_2$ index. A basic problem is that these three operations do not commute. The two partial Fourier transforms commute with respect to each other, but they do not commute with the middle, post-multiplication, term.

The structure of a CZT embodiment using equation (12) is identical to that shown in FIG. 7, but the scan differs from that of FIG. 1, and the required partial CZT differs from that of FIG. 5. The postmultiplier of the partial CZT for the lexical scan can not be the same for all horizontal channels because of the presence of the additional factor of $$e^{-i2\pi\frac{j_2k_1}{N}}.$$

In essence, the postmultiplier chirps of the partial CZT using the lexical scan must be on different (discrete) carrier frequencies.

It will be noted that when a lexical scan is used, the order in which the horizontal and vertical transforms are performed is critical. For the scans shown in FIG. 10, the vertical transform must be performed first. Unfortunately, this prevents the transform points from coming out in natural order. However, this should not present any difficulty for performing convolution by multiplying in the frequency domain.

As has been explained in great detail hereinabove, there are two basic forms of the invention corresponding to the two different ways of mapping a one-dimensional data sequence into a two-dimensional data sequence.

The first described method relates to a linear congruential scan, described in equations (3) and (4), and in FIG. 1. The other method employs a lexical scan, and is described in equations (9) and (10) and in FIG. 10.

There are two differences in the transform devices using the two types of scans. The first difference is in the input multiplexer. In the linear congruential scan, the multiplexer 10 shown in FIG. 2 is used. For the lexical scan, the simpler and less expensive multiplexer 140 of FIG. 11 is used.

With respect to alternative embodiments, other types of tapped delay lines and multipliers may be used, provided that the ratio of speed of the high-speed components to the speed of the low-speed components equals the ratio of the complete transform size to the size of the second partial transform dimension.

Obviously, many modifications and variations of the present invention are possible in the light of the above teachings. It is therefore to be understood that within the scope of the appended claims the invention may be practiced otherwise than as specifically described.

What is claimed is:

1. Apparatus for performing a high-capacity two-dimensional, chirp Z transform, in size $N_1$ times $N_2$, suitable for the signal processing of radar and sonar signals, comprising:

an $N_2$ plurality of two-dimensional partial chirp-Z transform devices, each transform device comprising:

a discrete chirp generator, which comprises a source of $e^{-\pi n^2/N_2}$ signals, for $n = 0, 1, \ldots, N_2-1$;

a plurality of $N_1$ signal input multipliers, each receiving two inputs, one being of the $N_1$ columnar input transform values;

a single-pole double-throw (SPDT) switching means, having a switching pole connected to the discrete chirp generator. one fixed pole, the input pole, being connected to each of the $N_1$ input multipliers;

a plurality of $N_1$ input discrete chirp filters with tap weights of $e^{-i \quad m^2/N_2}$, for $m = -(N_2-1), \ldots, (N_2-1)$, each filter having its input connected to the output of one of the $N_1$ input multipliers; and a plurality of $N_1$ signal output multipliers, each multiplier having one input connected to the output of one of the discrete chirp filters, the other input being connected to the other pole, the output pole, of the SPDT switching device, the $N_1$ outputs of the multipliers comprising output signals $$\sum_{j_2=0}^{N_2-1} g_{i,j_2} e^{-i2\pi(j_2 \; 2 \cdot N_2)}; \text{ and}$$

an acoustic surface-wave demultiplexer and chirp multiplier, whose inputs comprise all the outputs of the partial transform devices;

an acoustic surface-wave discrete chirp filter, whose input comprises the output of the demultiplexer and chirp multiplier; and an output multiplier whose two inputs comprise the output of the surface-wave discrete chirp filter and the output of the acoustic surface-wave discrete chirp generator, the output of the output multiplier comprising the terms of a one-dimensional chirp-Z transform in a linear congruential scan.

2. The apparatus according to claim 1, wherein: the switching device comprises high-speed analog switches in the form of balanced mixers.

* * * * *